United States Patent [19]
Nasu et al.

[11] Patent Number: 5,338,552
[45] Date of Patent: Aug. 16, 1994

[54] PROCESS FOR PRODUCING BREAD DOUGH

[75] Inventors: Hideo Nasu; Toshihiko Tezuka; Seijiro Inoue, all of Inashiki, Japan

[73] Assignee: Kyowa Hakko Kogyo, Co., Tokyo, Japan

[21] Appl. No.: 916,131

[22] PCT Filed: Nov. 29, 1991

[86] PCT No.: PCT/JP91/01669

§ 371 Date: Jul. 30, 1992

§ 102(e) Date: Jul. 30, 1992

[87] PCT Pub. No.: WO 92/09204

PCT Pub. Date: Jun. 11, 1992

[30] Foreign Application Priority Data

Nov. 30, 1990 [JP] Japan ................... 2-334658

[51] Int. Cl.$^5$ .......................... A21D 2/06; A21D 2/14
[52] U.S. Cl. .......................... 426/19; 426/28; 426/20; 426/24; 426/25
[58] Field of Search .......... 426/19, 28, 20, 24, 426/25

[56] References Cited

FOREIGN PATENT DOCUMENTS

| | | |
|---|---|---|
| 62-237 | 1/1987 | Japan . |
| 63-160540 | 7/1988 | Japan . |
| 342697 | 2/1931 | United Kingdom . |
| 343193 | 2/1931 | United Kingdom . |

*Primary Examiner*—Joseph Golian
*Attorney, Agent, or Firm*—Antonelli, Terry, Stout & Kraus

[57] ABSTRACT

According to the present invention, bread dough can be produced in a very short time by kneading 40 to 80 parts by weight of flour, 30 to 80 parts by weight of water, provided that the amount of water does not exceed that of flour, and a suitable amount of yeast, to such an extent that dough breakdown of the mixture begins within 5 minutes as determined by a resistograph (first step); and adding to the mixture, immediately or after allowing the mixture to rest to cause fermentation, such an amount of flour that the total amount thereof will reach 100 parts by weight, and if necessary, a suitable amount of water, followed by kneading (second step).

Further, dough having excellent elasticity can be obtained by adding an acid to the ingredients for kneading in the first step to adjust the pH of the kneaded mixture obtained in the first step to 4–5 and adding a salt to the ingredients for kneading in the second step to adjust the pH of the dough obtained in the second step to 5–6. Bread produced from the obtained dough has a high machinability. By addition of a reducing agent, amylase, an emulsifying agent or an oxidizing agent in the first or second step, dough having improved properties can be obtained.

3 Claims, No Drawings

PROCESS FOR PRODUCING BREAD DOUGH

TECHNICAL FIELD

The present invention relates to a process for producing bread dough. More particularly, the present invention relates to a process for producing bread dough which comprises dividing flour to be used into two portions; thoroughly kneading one portion with yeast and water; adding the remaining flour to the kneaded mixture immediately or after fermentation of the kneaded mixture for a short period of time; and further kneading the mixture. According to the process, time required for producing bread dough can be remarkably shortened without giving influence on the properties of dough. Bread dough further improved in quality can be obtained by adjusting the pH of the kneaded mixture to a specific range in the process.

PRIOR ART

For producing bread dough, the straight dough method has been conventionally employed, in which flour, water, yeast, etc. are kneaded and the kneaded mixture is fermented with punching once or twice, divided and molded, followed by proofing. As an improved method, there is known the sponge-dough method which comprises kneading a part of flour and yeast with water, fermenting the mixture for 4 to 5 hours to prepare sponge, adding the remaining flour, water, etc. to the sponge, and kneading the mixture. The sponge-dough method requires 4 to 5 hours for fermentation and it has thus been desired to shorten the time.

There is also known an improved method in which a large quantity of water is added to a part of flour and the mixture is stirred at a high speed to form a fluid (Japanese Published Examined Patent Application No. 6244/81). However, the sponge obtained by this method is fluid and viscosity of the sponge is low. For this reason, it is difficult to convey energy to the sponge so that it is impossible to efficiently carry out kneading, and a considerably long period of time is required to obtain the objective sponge.

In another modification of the sponge-dough method, during the sponge mixing steps, a large quantity of water is added to flour and the sponge is adjusted to pH 4.5–5.5, followed by mixing to form a fluid (Japanese Published Unexamined Patent Application No. 160540/88). This method also has a disadvantage that energy is not readily transferred to the sponge because the sponge is a fluid, and hence it is impossible to efficiently carry out kneading and a considerably long time is required to obtain the objective sponge. Further, addition of an acid to the dough in order to lower the pH causes problems in handling such as stickiness of the dough.

There is also known a method for producing bread in which amylase is added in the sponge mixing step and an organic acid or its salt is added in the dough mixing step (Japanese Published Unexamined Patent Application No. 14653/88). In this method, an organic acid or its salt is added to remove harmful effects caused by the addition of amylase. It is described in the patent application supra that any good effect is not imparted to the dough by adding an organic acid to the sponge (first step).

These improvements on the sponge-dough method are all to improve properties of dough, and these prior publications are silent about the reduction in time for preparing dough.

It takes about 7 hours to prepare bread dough by the sponge-dough method and it has been desired to shorten the time in baking industry.

Investigations have been made to shorten the time required for the sponge fermentation in the process for producing bread dough. As a result, it has been found that the fermentation time can be remarkably shortened by adding water to a part of flour used for bread-making and yeast and kneading the mixture until the mixture becomes viscous.

DISCLOSURE OF THE INVENTION

According to the present invention, bread dough can be produced in a very short time by kneading 40 to 80 parts by weight of flour, 30 to 80 parts by weight of water, provided that the amount of water does not exceed that of flour, and a suitable amount of yeast, to such an extent that dough breakdown of the mixture begins within 5 minutes as determined by a resistograph (first step); and adding to the mixture, immediately or after allowing the mixture to rest to cause fermentation, such an amount of flour that the total amount thereof will reach 100 parts by weight, and if necessary, a suitable amount of water, followed by kneading (second step).

Further, dough having excellent elasticity can be obtained by adding an acid to the ingredients for kneading in the first step to adjust the pH of the kneaded mixture obtained in the first step to 4–5 and adding a salt to the ingredients for kneading in the second step to adjust the pH of the dough obtained in the second step to 5–6. Bread produced from the obtained dough has a high machinability.

In cases where a reducing agent, amylase, an emulsifying agent, an oxidizing agent, etc. conventionally used in a process for making bread are added in the first step or in the second step, their respective known effects can be expected also in the present invention.

The aforesaid resistograph is known as an instrument for examining properties of dough and is commercially available.

In this specification, the term "the dough breakdown begins within . . . minutes" is used to mean the time taken for the dough breakdown to start as determined by a treatment of the kneaded mixture with the resistograph immediately after the kneading.

According to the method of the present invention, the time required for the kneading is longer than in the sponge-dough method, but the fermentation time of the kneaded mixture obtained in the first step can be greatly shortened from 4–5 hours to one hour at the maximum.

The present invention is described in detail below.

In carrying out the present invention, flour, yeast and water are kneaded with an appropriate kneader. As a kneader (mixer), a vertical mixer and a horizontal mixer which are widely used in the production of dough may be used.

When the total amount of flour used for preparing dough is made 100 parts by weight, 40 to 80 parts by weight, preferably 50 to 70 parts by weight of flour is used in the first step. If the amount of flour is less than 40 parts by weight, the amount of the mixture to be kneaded is too small for the kneading facility of a mixer and it is difficult to carry out kneading, though the situation may slightly change according to the type of a mixer. If the amount of flour is larger than 80 parts by weight, the effects of the present invention decrease.

In the first step, 30 to 80 parts by weight of water is used, provided that the amount of water does not exceed that of flour. If the amount of water is larger than that of flour, the mixture obtained in the first step is a fluid and the viscosity of the mixture is low. For this reason, it is difficult to transfer energy to the mixture so that kneading cannot be carried out efficiently.

Kneading is carried out to such an extent that the dough breakdown of the resulting kneaded mixture starts within 5 minutes, preferably 2 minutes, as determined by a resistograph. When the viscosity of a portion of the mixture obtained in the first step (160 g) is measured with a resistograph, it is presumed that the dough breakdown in resistogram begins early as the amount of gluten formed in the first step is larger.

An acid may be added to adjust the pH of the kneaded mixture obtained in the first step to 4 to 5, and examples of the acid are organic acids such as acetic acid, lactic acid, citric acid, fumaric acid, malic acid, succinic acid, pyruvic acid, tartaric acid, ascorbic acid, gluconic acid, and secondary phosphoric acid.

The acid is used generally in an amount of 0.01 to 1.0 part by weight based on the weight of flour used in the first step, though the amount of the acid varies depending upon its kind.

If the pH of the kneaded mixture obtained in the first step is higher than 5, the improving effect on the theological properties of dough is poor; and if the pH is less than 4, dough obtained in the second and subsequent steps becomes undesirably sticky.

When the acid is added to adjust the pH of the kneaded mixture obtained in the first step to 4 to 5, the elasticity of the kneaded mixture decreases. Therefore, it is sometimes difficult to determine the start of dough breakdown with a resistograph. In such a case, kneading may be carried out in the first step for the same period of time as required until 5 minutes or less before the start of the dough breakdown of the kneaded mixture when no acid is added.

In the first step, a reducing agent, amylase, yeast food, sugar, whole egg, etc. may be added, if necessary. As the reducing agent, cysteine hydrochloride, glutathione, etc. may be used.

Amylase is added in an amount of 10 to 500 SKB unit/100 g of flour. Amylase may be added in the second step described below, but is generally added in the first step.

Kneading in the first step is generally carried out for 5 to 15 minutes, though the kneading time varies depending upon the kneader (mixer) used, kneading conditions, amounts of flour and water, etc. By adding 2 to 40 ppm of a reducing agent, the kneading time in the first step can be shortened to 3 to 8 minutes.

To the kneaded mixture thus obtained in the first step are added the remaining flour and water immediately or after fermentation for a period within one hour, followed by kneading using a kneader (mixer) as in the first step (second step).

In the second step, a salt may be added to adjust the pH of the dough to 5 to 6, preferably 5.4 to 5.7. As the salt, alkali metal salts and alkaline earth metal salts of the organic acids mentioned above, sodium carbonate, etc. may be used.

The salt is used generally in an amount of 0.01 to 1.0 part by weight based on the total weight of flour used, though the amount of the salt varies depending upon its kind.

If the pH of the dough is lower than 5, stickiness of the dough remains; and if the pH is higher than 6, elasticity and strength of the dough decrease.

In the second step, an emulsifying agent, an oxidizing agent, sugar, salt, shortening, skim milk powder, etc. may be added, if necessary.

As the emulsifying agent, glycerine fatty acid esters, sucrose fatty acid esters, sorbitan fatty acid esters, propylene glycol fatty acid esters, lecithin, calcium stearoyl lactate, sodium stearoyl lactate, etc. may be used in an amount of 0.01 to 0.5 part by weight based on the total weight of flour.

As the oxidizing agent, ascorbic acid, potassium bromate, potassium iodide, etc. may be used in an amount of 2 to 10 ppm. The oxidizing agent may be added in the first step but is generally added in the second step.

Kneading in the second step is generally carried out for 10 to 15 minutes, though the kneading time varies depending upon the kneader (mixer) used, kneading conditions, amounts of flour and water, etc.

Bread can be produced from the thus obtained dough through the steps of floor time, dividing, molding, proofing and baking in a conventional manner.

BEST MODE FOR CARRYING OUT THE INVENTION

Examples, comparative examples and a reference example are shown below.

The pH of dough was determined by adding 90 ml of distilled water to 10 g of the dough, homogenizing the mixture at 10,000 rpm for 3 minutes using a homogenizer, and then measuring the pH with a pH meter.

EXAMPLE 1

| Ingredients for Kneading in the First Step | | |
|---|---|---|
| Flour | 50 | parts by weight |
| Yeast | 3 | " |
| Water | 40 | " |
| Ingredients for Kneading in the Second Step | | |
| Flour | 50 | parts by weight |
| Sugar | 5 | " |
| Salt | 2 | " |
| Shortening | 5 | " |
| Skim milk powder | 2 | " |
| Yeast food | 0.1 | " |
| Water | 30 | " |

The above-mentioned ingredients for kneading in the first step were kneaded at a low speed (30 rpm; hereinafter the same shall apply) for 3 minutes and at a high speed (90 rpm; hereinafter the same shall apply) for 12 minutes using a vertical mixer (KANTO MIXER: 10 coat). A portion of the mixture (160 g) was applied to a resistograph, and it was found that dough breakdown started after 1.5 minute. Then, the above-mentioned ingredients for kneading in the second step except shortening were added to the mixture. After kneading at a low speed for 3 minutes and at a medium speed (60 rpm; hereinafter the same shall apply) for 2 minutes in the same manner as described above, shortening was added to the mixture, followed by kneading at a low speed for 2 minutes, at a medium speed for 3 minutes and at a high speed for 4 minutes.

After the second step, the dough was allowed to rest for 20 minutes in a conventional manner (floor time). The dough was then divided into a piece of 220 g for pullman bread and a piece of 450 g for one-loaf bread, and each piece was rounded. After intermediate proofing for 20 minutes, the dough was molded using a molder and fermented in a proofing box at a temperature of 38° C. and humidity (RH) of 85%. Fermentation was carried out until the height of the dough reached 1.5 cm above the mold for the one-load bread and was carried out for 45 minutes for the pullman bread. Thereafter, the one-load bread and the pullman bread were baked in an oven at a temperature of 220° C. for 25 minutes and for 28 minutes, respectively.

Table 1 shows the results of evaluation of the rheological properties of the dough in the first step and the second step and the quality of the bread prepared.

EXAMPLE 2

In this example, L-cysteine hydrochloride was used as a reducing agent.

| Ingredients for Kneading in the First Step | | |
|---|---|---|
| Flour | 70 | parts by weight |
| Yeast | 3 | " |
| Water | 49 | " |
| L-Cysteine hydrochloride | 15 | ppm |
| Ingredients for Kneading in the Second Step | | |
| Flour | 30 | parts by weight |
| Sugar | 5 | " |
| Salt | 2 | " |
| Shortening | 5 | " |
| Skim milk powder | 2 | " |
| Yeast food | 0.1 | " |
| Water | 21 | " |

The above-mentioned ingredients for kneading in the first step were kneaded at a low speed for one minute and at a high speed for 5 minutes using a vertical mixer. A portion of the mixture (160 g) was applied to a resistograph, and it was found that dough breakdown started after 3 minutes. Then, the same procedure as in Example 1 was repeated except that the above-mentioned ingredients for kneading in the second step were used, whereby pullman bread and one loaf-bread were prepared.

Table 1 shows the results of evaluation of the rheological properties of the dough in the first step and the second step and the quality of the bread prepared.

EXAMPLE 3

In this example, the kneaded mixture obtained in the first step was fermented and then subjected to the second step.

| Ingredients for Kneading in the First Step | | |
|---|---|---|
| Flour | 60 | parts by weight |
| Yeast | 3 | " |
| Sugar | 1 | " |
| Water | 36 | " |
| Ingredients for Kneading in the Second Step | | |
| Flour | 40 | parts by weight |
| Sugar | 5 | " |
| Salt | 2 | " |
| Shortening | 5 | " |
| Skim milk powder | 2 | " |
| Yeast food | 0.1 | " |
| Water | 34 | " |

The above-mentioned ingredients for kneading in the first step were kneaded at a low speed for one minute and at a high speed for 7 minutes using a vertical mixer. A portion of the mixture (160 g) was applied to a resistograph, and it was found that dough breakdown started after 2.5 minutes. After the kneaded mixture was fermented in a fermentation room at 28° C. for 30 minutes, the same procedure as in Example 1 was repeated except that the above-mentioned ingredients for kneading in the second step were used. Thus, one-loaf bread and pullman bread were prepared.

Table 1 shows the results of evaluation of the rheological properties of the dough in the first step and the second step and the quality of the bread prepared.

EXAMPLE 4

In this example, sweet bread was prepared.

| Ingredients for Kneading in the First Step | | |
|---|---|---|
| Flour | 60 | parts by weight |
| Yeast | 3.5 | " |
| Sugar | 4 | " |
| Whole egg | 4 | " |
| Water | 35 | " |
| Ingredients for Kneading in the Second Step | | |
| Flour | 40 | parts by weight |
| Sugar | 20 | " |
| Salt | 1 | " |
| Shortening | 8 | " |
| Skim milk powder | 2 | " |
| Yeast food | 0.1 | " |
| Water | 20 | " |

The above-mentioned ingredients for kneading in the first step were kneaded at a low speed for 3 minutes and at a high speed for 12 minutes using a vertical mixer. A portion of the mixture (160 g) was applied to a resistograph, and it was found that dough breakdown started after 0.5 minute. Then, the above-mentioned ingredients for kneading in the second step except shortening were added to the mixture. After kneading at a low speed for 3 minutes and at a medium speed for 2 minutes, shortening was added to the mixture, followed by kneading at a low speed for 2 minutes, at a medium speed for 3 minutes and at a high speed for 2 minutes.

After the second step, the dough was allowed to rest for 20 minutes in a conventional manner (floor time). The dough was then divided into pieces of 60 g each and each piece was rounded. After intermediate proofing for 20 minutes, the dough was molded using a molder. The molded pieces of dough were fermented in a proofing box at a temperature of 38° C. and humidity (RH) of 85% for 45 minutes, followed by baking in an oven at a temperature of 200° C. for 12 minutes to prepare sweet roll bread.

Table 1 shows the results of evaluation of the theological properties of the dough in the first step and the second step and the quality of the bread prepared.

EXAMPLE 5

In this example, the pH was adjusted in the first step by adding an acid and by adding a salt in the second step.

| Ingredients for Kneading in the First Step | | |
|---|---|---|
| Flour | 60 | parts by weight |
| Yeast | 3 | " |
| Citric acid | 0.12 | " |
| Water | 42 | " |
| Ingredients for Kneading in the Second Step | | |
| Flour | 40 | parts by weight |
| Sugar | 5 | " |
| Salt | 2 | " |

| | | |
|---|---|---|
| Shortening | 5 | " |
| Skim milk powder | 2 | " |
| Yeast food | 0.1 | " |
| Sodium carbonate | 0.06 | " |
| Water | 26 | " |

The above-mentioned ingredients for kneading in the first step were kneaded at a low speed for one minute and at a high speed for 7 minutes using a vertical mixer. A portion of the mixture (160 g) was applied to a resistograph, and it was found that dough breakdown started after 0 minute. The pH of the kneaded mixture was 4.2. Then, the above-mentioned ingredients for kneading in the second step except shortening were added to the mixture. After kneading at a low speed for 3 minutes and at a medium speed for 2 minutes in the same manner as described above, shortening was added to the mixture, followed by kneading at a low speed for 2 minutes, at a medium speed for 3 minutes and at a high speed for 2 minutes. The pH of the dough was 5.6.

After the second step, the dough was allowed to rest for 20 minutes in a conventional manner (floor time). The dough was then divided into a piece of 220 g for pullman bread and a piece of 450 g for one-loaf bread, and each piece was rounded. After intermediate proofing for 20 minutes, the dough was molded using a molder and fermented in a proofing box at a temperature of 38° C. and humidity (RH) of 85%. Fermentation was carried out until the height of the dough reached 1.5 cm above the mold for the one-loaf bread and was carried out for 45 minutes for the pullman bread. Thereafter, the one-loaf bread and the pullman bread were baked in an oven at a temperature of 220° C. for 25 minutes and for 28 minutes, respectively.

Table 1 shows the results of evaluation of the rheological properties of the dough in the first step and the second step and the quality of the bread prepared.

EXAMPLE 6

In this example, the pH was adjusted in the first step by adding an acid and by adding a salt in the second step and a glycerine fatty acid ester, potassium bromate and amylase were added in the second step.

| Ingredients for Kneading in the First Step | | |
|---|---|---|
| Flour | 50 | parts by weight |
| Yeast | 3 | " |
| 10% Acetic acid | 1.5 | " |
| Water | 40 | " |
| Ingredients for Kneading in the Second Step | | |
| Flour | 50 | parts by weight |
| Sugar | 5 | " |
| Salt | 2 | " |
| Shortening | 5 | " |
| Skim milk powder | 2 | " |
| Sodium carbonate | 0.04 | " |
| Glycerine fatty acid ester | 0.3 | " |
| Potassium bromate | 10 | ppm |
| Amylase | 90 | SKB unit/100 g flour |
| Water | 30 | parts by weight |

The above-mentioned ingredients for kneading in the first step were kneaded at a low speed for one minute and at a high speed for 7 minutes using a vertical mixer. A portion of the mixture (160 g) was applied to a resistograph, and it was found that dough breakdown started after 0 minute. The pH of the kneaded mixture was 4.5. Then, the ingredients for kneading in the second step except shortening were added to the mixture. After kneading at a low speed for 3 minutes and at a medium speed for 2 minutes in the same manner as described above, shortening was added to the mixture, followed by kneading at a low speed for 2 minutes, at a medium speed for 3 minutes and at a high speed for 2 minutes. The pH of the dough was 5.5. After the second step, the same procedure as in Example 5 was repeated to prepare one-loaf bread and pullman bread.

Table 1 shows the results of evaluation of the rheological properties of the dough in the first step and the second step and the quality of the bread prepared.

COMPARATIVE EXAMPLE 1

In this example, the kneading time in the first step was shortened.

The same ingredients for kneading in the first step as used in Example 1 were kneaded at a low speed for 3 minutes and at a high speed for 2 minutes using a vertical mixer. A portion of the mixture (160 g) was applied to a resistograph, and it was found that dough breakdown started more than 20 minutes later. Then, the same procedure for the second and subsequent steps as in Example 1 was repeated to obtain pullman bread and one-loaf bread.

Table 1 shows the results of evaluation of the rheological properties of the dough in the first step and the second step and the quality of the bread prepared.

COMPARATIVE EXAMPLE 2

In this example, the proportion of flour to water in the first step is changed to obtain the kneaded mixture as a fluid.

| Ingredients for Kneading in the First Step | | |
|---|---|---|
| Flour | 30 | parts by weight |
| Yeast | 3 | " |
| Water | 70 | " |
| Ingredients for Kneading in the Second Step | | |
| Flour | 70 | parts by weight |
| Sugar | 5 | " |
| Salt | 2 | " |
| Shortening | 5 | " |
| Skim milk powder | 2 | " |
| Yeast food | 0.1 | " |

The above-mentioned ingredients for kneading in the first step were kneaded in the same manner as in Example 1 using a vertical mixer. The kneaded mixture was a fluid and no gluten was formed. It was impossible to measure the time taken for dough breakdown to start with a resistograph. Then, the above-mentioned ingredients for kneading in the second step except shortening were added to the mixture. After kneading at a low speed for 3 minutes and at a medium speed for 2 minutes in the same manner as described above, shortening was added to the mixture, followed by kneading at a low speed for 2 minutes, at a medium speed for 3 minutes and at a high speed for 6 minutes. After the second step, the same procedure as in Example 1 was repeated to prepare one-loaf bread and pullman bread.

Table 1 shows the results of evaluation of the rheological properties of the dough in the first step and the second step and the quality of the bread prepared.

COMPARATIVE EXAMPLE 3

In this example, the pH of the kneaded mixture was lowered to 4.2 in the first step but the pH was not adjusted in the second step.

One-loaf bread and pullman bread were prepared from the same ingredients by the same procedure as in Example 5, except that sodium carbonate was excluded from the ingredients for kneading in the second step.

Table 1 shows the results of evaluation of the rheological properties of the dough in the first step and the second step and the quality of the bread prepared.

REFERENCE EXAMPLE

An example of the conventional sponge-dough method is shown.

Ingredients for Kneading in the First Step

| | |
|---|---|
| Flour | 70 parts by weight |
| Yeast | 2 " |
| Yeast food | 0.1 " |
| Water | 42 " |

Ingredients for Kneading in the Second Step

| | |
|---|---|
| Flour | 30 parts by weight |
| Sugar | 5 " |
| Salt | 2 " |
| Shortening | 5 " |
| Skim milk powder | 2 " |
| Water | 26 " |

The above-mentioned ingredients for kneading in the first step were kneaded at a low speed for 3 minutes and at a high speed for one minute using a vertical mixer, followed by fermentation in a fermentation room at 28° C. for 4 hours. The pH of the kneaded mixture was 5.7 before the fermentation and was 5.0 after the fermentation. Before the fermentation step, it was found by using a resistograph that dough breakdown of the kneaded mixture obtained in the first step started after 7 minutes.

Then, the ingredients for kneading in the second step except shortening were added to the mixture. After kneading at a low speed for 3 minutes and at a medium speed for 2 minutes in the same manner as described above, shortening was added to the mixture, followed by kneading at a low speed for 2 minutes, at a medium speed for 3 minutes and at a high speed for 3 minutes. The pH of the dough was 5.4. After the second step, the same procedure as in Example 5 was repeated to prepare one-loaf bread and pullman bread.

Table 1 shows the results of evaluation of the theological properties of the dough in the first step and the second step and the quality of the bread prepared.

TABLE 1

| Item for Evaluation | Ex. 1 | Ex. 2 | Ex. 3 | Ex. 4 | Ex. 5 | Ex. 6 | Comp. Ex. 1 | Comp. Ex. 2 | Comp. Ex. 3 | Reference Example |
|---|---|---|---|---|---|---|---|---|---|---|
| Time taken for dough breakdown to start (min.) | 1.5 | 3 | 2.5 | 0.5 | 0 | 0 | more than 20 mins. | — | 0 | 7 |
| pH of dough after first kneading | 5.6 | 5.6 | 5.6 | 5.6 | 4.2 | 4.6 | 5.6 | 5.6 | 4.2 | 5.6 |
| pH of dough after second kneading | 5.6 | 5.6 | 5.4 | 5.6 | 5.6 | 5.5 | 5.6 | 5.6 | 4.9 | 5.4 |
| Rheological properties of dough | | | | | | | | | | |
| Extensibility | ○ | ◉ | ◉ | ○ | ◉ | ◉ | x | △ | △ | ◉ |
| Elasticity | ○ | ○ | ○ | ○ | ◉ | ◉ | △ | △ | x | ○ |
| Stickiness | ◉ | ◉ | ○ | ◉ | ◉ | ◉ | ○ | ○ | x | ◉ |
| Quality of Product | | | | | | | | | | |
| Specific volume | 5.8 | 5.9 | 6.0 | 5.5 | 5.9 | 6.0 | 5.4 | 5.6 | 5.2 | 5.9 |
| Machinability | 4.5 | 4.6 | 4.6 | 4.5 | 5.0 | 4.9 | 4.4 | 4.5 | 4.4 | 5.1 |
| Crumb grain | ○ | ○ | ○ | ○ | ◉ | ◉ | △ | △ | x | ◉ |
| Texture | ○ | ○ | ◉ | ◉ | ○ | ○ | x | △ | △ | ○ |
| Flavor | ○ | ○ | ◉ | ◉ | ○ | ○ | x | △ | △ | ◉ |
| Total evaluation | ○ | ○ | ◉ | ◉ | ◉ | ◉ | x | △ | △ | ◉ |

Evaluation standard: ◉: very good ○: good △: moderate x: poor

We claim:

1. A process for producing bread dough which comprises kneading, for 3 to 15 minutes, 40 to 80 parts by weight of flour, 30 to 80 parts by weight of water, provided that the amount of water does not exceed that of flour, and a suitable amount of yeast, and adding an acid to the mixture for kneading to adjust the pH of the kneaded mixture to 4 to 5 as a first step; adding to the mixture immediately or after allowing the mixture to rest, such an amount of flour that the total amount thereof will reach 100 parts by weight; and adding a salt to adjust the pH of the dough to 5 to 6, followed by kneading as a second step.

2. A process according to claim 1, wherein a reducing agent, amylase, an emulsifying agent or an oxidizing agent is added in the first step or in the second step.

3. A process according to claim 1, wherein kneading in the second step is carried out for 10 to 15 minutes.

* * * * *